United States Patent [19]

Satsumabayashi et al.

[11] 4,062,550
[45] Dec. 13, 1977

[54] SEAL ASSEMBLY WITH BACKUP RING

[75] Inventors: Kazuyoshi Satsumabayashi, Nagaokakyo; Akira Yoshihashi, Hirakata; Takeshi Kato, Hirakata; Osamu Omote, Hirakata, all of Japan

[73] Assignee: Kabushiki Kaisha Komatsu Seisakusho, Toyko, Japan

[21] Appl. No.: 724,748

[22] Filed: Sept. 17, 1976

[30] Foreign Application Priority Data

Sept. 17, 1975 Japan ............................ 50-126900[U]

[51] Int. Cl.² ............................................. B62D 55/20
[52] U.S. Cl. ........................................ 277/92; 305/11
[58] Field of Search ...................... 277/83, 92, 96, 165; 305/11

[56] References Cited

U.S. PATENT DOCUMENTS

| 3,829,173 | 8/1974 | Stedman | 305/11 |
| 3,841,718 | 10/1974 | Reinsma | 305/11 |
| 3,909,076 | 9/1975 | Kato | 305/11 |
| 3,948,574 | 4/1976 | Baylor | 277/92 |
| 3,975,028 | 8/1976 | Satsumabayashi | 305/11 |

Primary Examiner—Robert I. Smith
Attorney, Agent, or Firm—Armstrong, Nikaido & Marmelstein

[57] ABSTRACT

A seal for a joint subjected to oscillatory motion has a W-shaped seal ring which encompasses a backup ring partially. The W-shaped seal ring comprises a driving flange, a sealing flange and an intermediate hinge section connecting the two flanges.

The backup ring is adapted to be fitted in the seal ring to force the driving flange into an interference fit with the counterbore walls so as to cause the driving torque to be applied through the seal ring. The seal ring is made of a tough abrasion-resistant material, whilst the backup ring is made of elastomeric material having excellent resiliency characteristics over a wide range of operating temperatures.

The load exerted on the seal flange face is the sum of the compression forces of the backup ring and the seal ring and an internal pressure developed in the enclosed space.

6 Claims, 14 Drawing Figures

SEAL ASSEMBLY WITH BACKUP RING

BACKGROUND OF THE INVENTION

This invention relates to a seal assembly for endless tracks used for construction vehicles and mining machines such as bulldozers, dozer shovels and power shovels etc., A seal assembly of this kind which has heretofore been employed comprises as shown in FIGS. 1 and 2, a W-shaped seal member "d" and a spacer "e" disposed within a counterbore wall "c" defined by a bush "a" and a link "b". Such sealing assembly is disadvantageous in that since earth and sand enter sometimes into "A" part, bush "a" tends to move in the direction of thrust and can not return accurately to its original position, and the seal member "d" tends to fall or move sidewards in the direction shown by an arrow in FIG. 2. Further, regarding the distribution of pressures "B" acting on the seal member "d", it is high in the inner peripheral portion and low in the outer peripheral portion, and a great deal of earth and sand tend to enter thereinto from the outer peripheral portion.

Another seal assembly is disclosed in U.S. Pat. No. 3,841,718 which comprises as shown in FIGS. 3 and 5 a seal member "d" having a lip "f" formed therewith. However, this type of seal assembly is disadvantageous in that it is difficult to assemble because of its lip type of seal; the lip "F" tends to fall or move sidewards in the direction shown by an arrow in FIG. 4; the lip extends inwardly as shown by broken lines in FIG. 3 when it is assembled so that it is necessary to provide a considerable clearance "l"; and a groove is formed in the face "g" of the lip "f" which contacts with the end face of the bush "a", thereby reducing the durability of the seal.

When foreign matters such as earth and sand etc. enter in between the bush "a" and the contact face "g" of the lip "f" as shown in FIG. 5, because of a narrow width of the contact face "g" of the lip "f", the contact face "g" becomes rough or the lip "f" per se is damaged thus causing oil leaks and reducing the sealing effect of the seal assembly.

SUMMARY OF THE INVENTION

It is, therefore, an object of the present invention to provide a seal which overcomes the above noted problems of the prior art seals.

It is another object of the present invention to provide a seal which ensures excellent sealing effect even when the abutting surface of the bushing becomes rough thereby preventing oil leakage therefrom.

It is still another object of the present invention to provide a seal which can be easily assembled without causing collapse of lip in lip type seals.

In accordance with the present invention, a seal ring is composed of a tough, abrasion-resistant material. The seal ring has a driving flange which is engaged in no-rotative driving contact state with the counterbore and a sealing flange engaged in annular rotative contact with an end face of a bushing to be sealed. An intermediate section of the seal ring connects the flanges. Central parts of the intermediate section is projected outwardly to form W-shaped seal ring in cross-section with the flanges. A backup ring of elastomeric material having a considerably large resiliency is disposed within the annular groove of the seal ring and is compressed axially between the driving flange and the sealing flange. The backup ring is disposed in the seal ring spaced apart from the intermediate section so as to form an enclosed space therebetween.

The load exerted on the seal flange face is sum of compression force of the backup ring and the seal ring and an inner pressure developed in the enclosed space.

Other objects, features and advantages of the present invention will be readily apparent from the following description taken in conjunction with the following drawings.

DETAILED DESCRIPTION OF THE PREFERRED EMBODIMENTS

Figure 1:
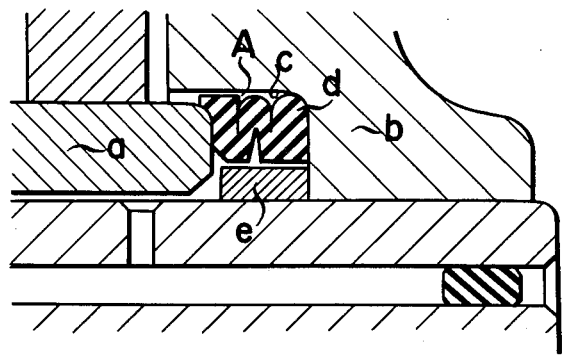
FIG. 1 is a longitudinal sectional view of the conventional seal assembly for linkage connectings of endless tracks.
Figure 2:
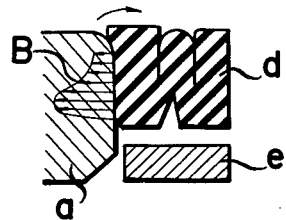
FIG. 2 is an enlarged view of the seal of FIG. 1.
Figure 3:
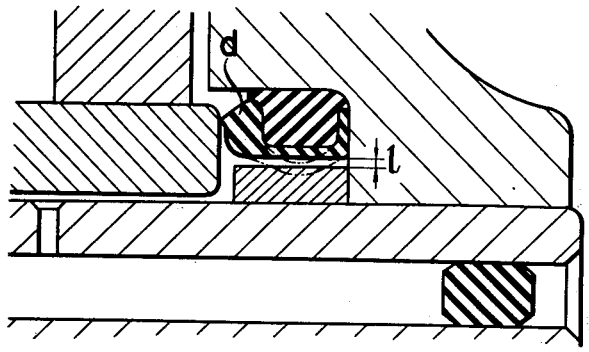
FIG. 3 is similar to FIG. 1 but showing another prior art.
Figure 5:
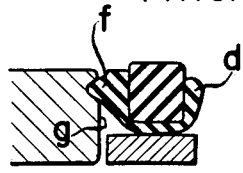
FIGS. 4 and 5 are views for explaining the operations of the seal of FIG. 3.
Figure 4:
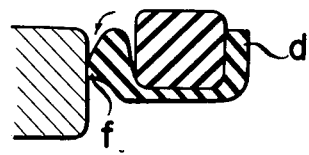
Figure 6:
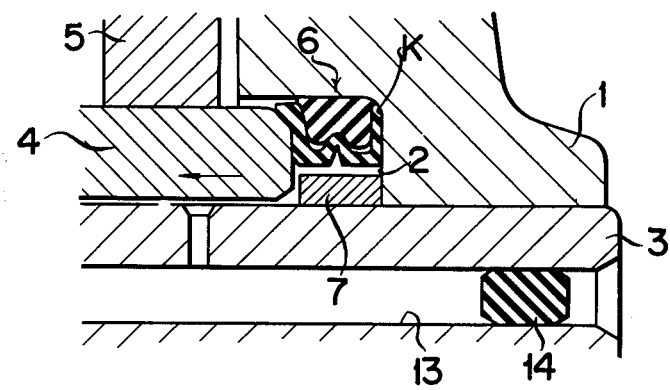
FIG. 6 is similar to FIG. 1 but showing a longitudinal sectional view of the seal assembly according to the present invention.

The present invention will now be described below with reference to FIGS. 6 to 10. In FIG. 6 reference numeral 1 denotes one of links which has a recess 2 formed therein, and a force-fitted pin 3 extends through the link 1. Another link 5 is connected through a bush 4 to the pin 3. One end of the bush 4 is inserted in the recess 2 so as to form a counterbore part "K" in which a seal member 6 and a spacer 7 are disposed. Some amount of oil is charged into a bore 13 of the pin 3. Reference numeral 14 represents a seal. Instead of using oil, grease may be applied between the pin 3 and the bush 4. In this case, the pin 3 is the type without having bore 13 in it. The seal member 6 is composed of a main seal ring 8 of hard rubber and a backup ring 9 of soft rubber.

Figure 7:
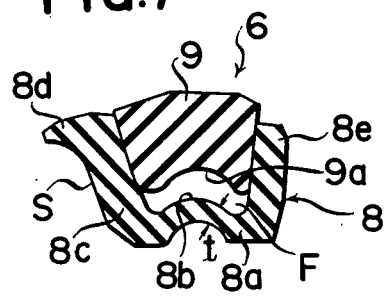
FIG. 7 is a sectional view of the seal ring and backup ring of the present invention.
Figure 8:
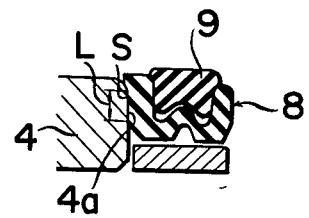
FIGS. 8, 9 and 10 are views for explaining the operations of the seal of FIG. 6.

The seal ring 8 is approximately W-shaped in cross section having a projection 8b projecting outwardly formed in the central part of its bottom part 8a. The W-shaped seal ring 8 has a thickness "t" as shown in FIG. 7 which is sufficient to provide an enough resiliency or elasticity by itself. The thickness "t" may be smaller than the thickness of sealing flange 8c, but it is desirable to keep it nearly equal to the latter in view of the fact that a more large effect of spring characteristics can be obtained. The seal ring 8 has a sealing flange 8c formed in one end thereof, and the sealing flange 8c has a projection 8d formed in the leading end thereof. The outer surface of the sealing flange 8c forms a seal face S. The seal ring 8 has also a driving flange 8e which is formed in the other end thereof and which is engaged in non-rotative driving contact relationship with side wall and end wall of the counterbore "K".

Whilst, the backup ring 9 has a recessed groove 9a in the inner peripheral surface thereof. When the backup ring 9 is fitted into the seal ring 8, they form an enclosed space "F" in which air is charged.

When such seal member 6 is set in the counterbore part "K", the seal ring 8 is expanded by the resilient force or pressure of the backup ring exerted thereon, so that the sealing face "S" is forcibly brought into contact with the end face 4a of the bush 4, and therefore a considerably large contact width "L" can be obtained.

Figure 10:
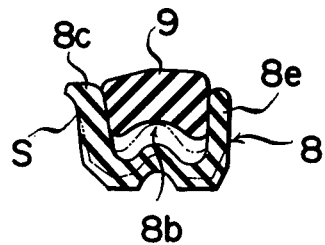

Further, when the seal member 6 is assembled or compressed in the counterbore part "K", the seal ring is deformed as shown by a dotted line in FIG. 10 so that the projection 8b may be moved outwardly as shown by an arrow and into the enclosed space "F". As a result, the air charged into the enclosed space "F" is compressed so as to build up an internal pressure therein. Moreover, the sealing flange 8c formed on the side portion of the seal ring 8 falls or moves sidewards towards the direction shown by an arrow in FIG. 10 so that the pressure exerted on the seal face "S" becomes substantially equal to the sum of the resiliency of the backup ring 9, the resiliency of the seal ring 8 and the internal pressure in the enclosed space "F".

When setting the seal member 6 within the counterbore part "K", even if the bush 4 moves in the direction shown by an arrow in FIG. 6, the seal face "S" will move or follow after such movement of the bush 4.

Figure 9:
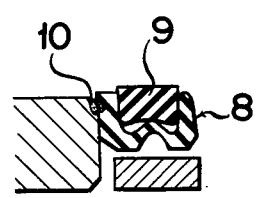

In the case of this type of seal assembly, only a portion 10 shown in FIG. 9 will be damaged by the entry of earth and sand therein without causing oil leaks.

Figure 11:
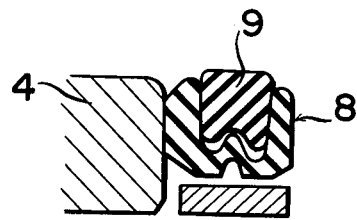
FIG. 11 is another embodiment of the seal of the present invention.

FIG. 11 illustrates another embodiment of the present invention which is substantially same as the above noted embodiment except that the projection 8d formed at the leading end of the sealing flange 8c in the previous embodiment is eliminated.

Figure 12:
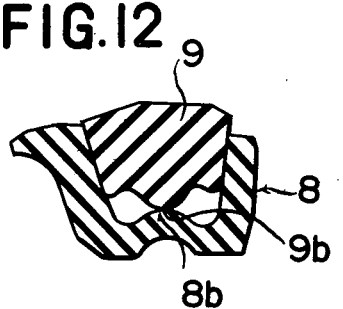
FIG. 12 is still another embodiment of the seal of the present invention.

FIG. 12 shows a further embodiment of the present invention wherein the central projection 8b of the seal ring 8 is permitted to abut against a central projection 9b of the backup ring 9 so as to prevent disengagement of the latter from the former thereby ensuring a more stable mounting of the backup ring, and other arrangements are the same as the previous embodiment.

Figure 13:
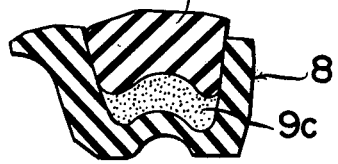
FIG. 13 is still another embodiment of the seal of the present invention.

FIG. 13 shows a still further embodiment of the present invention wherein a foam material 9c containing some amount of air is forced into the enclosed space "F" shown in FIG. 7 so as to obtain a superior resilient characteristic.

Figure 14:
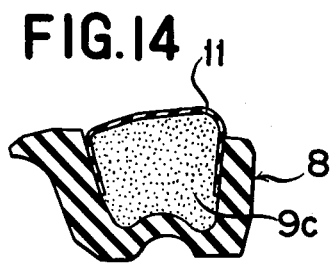
FIG. 14 is a further embodiment of the seal of the present invention.

FIG. 14 illustrates a still another embodiment of the present invention wherein the backup ring 9 of soft rubber shown in FIG. 7 is replaced by a backup ring 9c, the surface of which is coated by rubber at 11. In the case of this embodiment, the parts which are liable to contact with earth and sand art protected by the rubber coating 11 to prevent the escape of charged air to the outside so that an excellent resilient or resiliency characteristic and sealing effect can be obtained. The rubber coating 11 may extend the whole periphery of the backup ring 9c or in part thereof as shown in FIG. 14.

As mentioned in detail hereinabove, according to the present invention, when assemblying the seal member 6, the projection 8b formed in the central part of bottom part of the seal ring 8 is subjected to a compressive force and moves outwards so that the assembly of the seal member 6 can be effected even in a comparatively small space. Further, the air charged into the enclosed space "F" is compressed due to the deformation of the seal ring 8 which occurs at the time of assembly so as to build up an internal pressure within the enclosed space, and the pressure exerted on the seal face "S" is increased by the combination of the internal pressure and the resilient force of the backup ring 9 so that even if the end face of the bush becomes rough more or less due to abrasive effect of the earth and sand entered thereinto, excellent sealing effect of the seal face "S" can be obtained. Moreover, the seal face "S" becomes wider, and no oil leaks happen even if earth and sand entered thereinto. Furthermore, the seal face "S" will rapidly follow after the movement of the bush 4 by the action of the internal pressure developed in the enclosed space so that an excellent sealing effect can be maintained.

Since the sealing effect is obtained by face-sealing, no fall or sideward movement of the lip part occurs, and therefore the seal assembly can be assembled very easily.

Since various changes and modifications of the invention will occur to and can be made readily by those skilled in the art without departing from the invention concept, the invention is not to be taken as limited except by the scope of the appended claims.

We claim:

1. A seal assembly comprising first and second axially spaced members mounted for relative rotation about a common axis, the first member having a counterbore formed in one face, the second member having an end face opposite the counterbore;

a seal ring of tough abrasion-resistant material having a W-shaped configuration in cross section disposed within the counterbore defining an annular groove facing the side wall of the counterbore, said seal ring including a driving flange engaged in non-rotative driving contact relationship with the side wall and end wall of the counterbore at the juncture of these walls, a sealing flange adapted to be engaged in annular face sealing rotative contact relationship with the end face of the second member, said seal ring also having an intermediate section connecting flanges, the intermediate section of said seal ring being outwardly projected to form the seal ring in W-shaped configuration with the flanges; and a backup ring of elastomeric material having substantial resiliency characteristics, said backup ring being disposed within the annular groove of said W-shaped seal ring spaced substantially from the intermediate section of said seal ring so as to define and enclosed space between said backup ring and said seal ring, said backup ring being axially compressed between the driving flange and the sealing flange, whereas the load exerted on the seal flange face is the sum of the compression force of said backup ring and said seal ring and an internal pressure developed in the enclosed space.

2. The seal assembly of claim 1, wherein substantially entire surface of the sealing flange is in contact with the end face of said second member.

3. The seal assembly of claim 1, wherein the lower surface of said backup ring is in contact with the projection of the intermediate section of said seal ring.

4. The seal assembly of claim 1, wherein a foam material is disposed in the space defined between said backup ring and said seal ring.

5. The seal assembly of claim, wherein the wall thickness of the intermediate section of said seal ring is nearly equal to that of the flanges.

6. A seal assembly comprising first and second axially spaced members mounted for relative rotation about a common axis, the first member having a counterbore formed in one face, the second member having an end face opposite the counterbore;

a seal ring of tough abrasion-resistant material having a W-shaped configuration in cross section disposed within the counterbore defining an annular groove facing the side wall of the counterbore, said seal ring including a driving flange engaged in non-rotative driving contact relationship with the side wall and end wall of the counterbore at the juncture of these walls, a sealing flange adapted to be engaged in annular face sealing rotative contact relationship with the end face of the second member, said seal ring also having an intermediate section connecting flanges, the intermediate section of said seal ring being outwardly projected to form the seal ring in W-shaped configuration with the flanges; and a backup ring of foam material having elastomeric rubber coating on its surface, said backup ring being disposed within the annular groove of said W-shaped seal ring so as to engage substantially with the entire inner wall surfaces of the sealing flange, driving flange and intermediate section of said seal ring and being adapted to be axially compressed between the driving flange and the sealing flange, whereas the load exerted on the seal flange face is the sum of the compression force of said backup ring and said seal ring.

* * * * *